Dec. 17, 1963   J. MORKOSKI ETAL   3,114,227
COTTON PICKET DRUM STRUCTURE WITH INTEGRAL FAN
Filed Oct. 10, 1960

INVENTORS.
James Morkoski
John R. Timberlake
Paul O. Pippel
Atty.

United States Patent Office 3,114,227
Patented Dec. 17, 1963

3,114,227
COTTON PICKER DRUM STRUCTURE WITH INTEGRAL FAN
James Morkoski, Des Plaines, and John R. Timberlake, Downers Grove, Ill., assignors to International Harvester Company, Chicago, Ill., a corporation of New Jersey
Filed Oct. 10, 1960, Ser. No. 61,594
2 Claims. (Cl. 56—12)

This invention relates to cotton harvesters and more specifically to a novel cotton picker drum structure with a fan therein.

In cotton pickers of the type under consideration, the current designs in general provide a fan for creating suction in withdrawing the cotton from the cotton picker drum and blowing the same into an associated receptacle. The fan is located remotely from the drum which picks the cotton and there is provided a long suction piping between the drum and the fan and a relatively short blower piping through which the air and cotton are exhausted from the fan into an associated receptacle.

In a series of tests conducted to determine the efficiency of suction conveying versus blower conveying, we have found that the blower conveying is substantially more efficient. The problem that arises in a cotton harvester is that dimensionally the drum structure is almost fixed because the drum must fit between the rows of cotton plants and cannot be too ponderous for transport through the fields. In suction conveying the cotton is passed through a fan which creates problems in bypassing the fan to prevent seed cracking.

It is an object of this invention to provide a novel conveying system for the harvester which is integrated with the present drum construction and wherein the fan is so arranged to provide a suction length of relatively small extent and wherein the cotton is adapted to be blown from the cotton picker drum without passing through the fan into the receptacle which is normally supported at high elevation above the cotton plants so that it can be readily dumped into an associated receiving wagon or vehicle.

The invention contemplates a novel door structure for a cotton harvester of the type described wherein the fan is mounted within the drum door and wherein ducting is provided to lift cotton which may tend to fall to the bottom of the drum and blow the same into the air stream through the ducting into the receptacle.

A further object of the invention is to provide a novel arrangement and fan mounting in the drum door such as will readily permit opening and closing of the door for access into the drum.

These and other objects and advantages of the invention will become more readily apparent from the specification and the drawings wherein.

Figure 1:
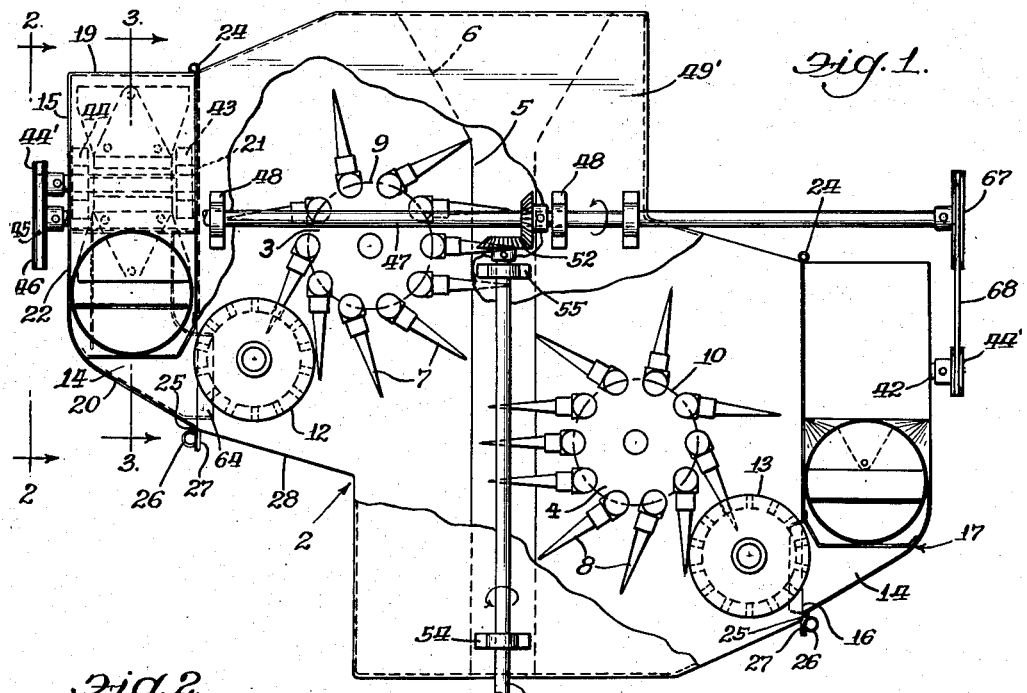
FIGURE 1 is a plan view partially in horizontal section of the cotton picker drum incorporating the invention.
Figure 2:
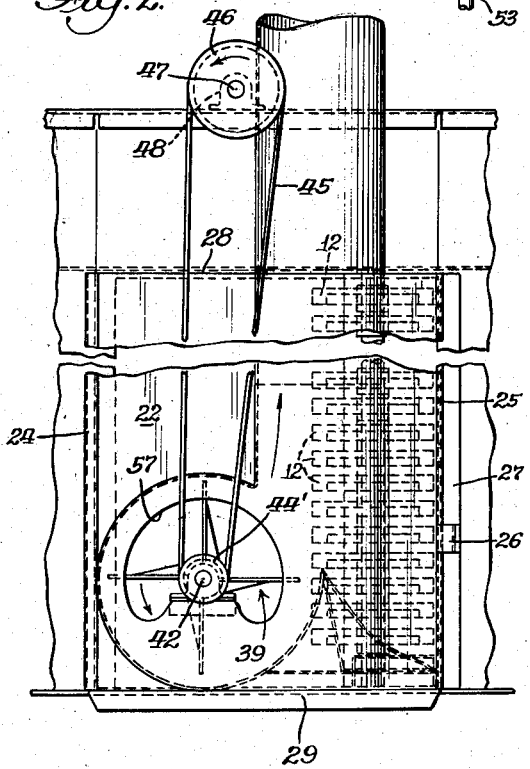
FIGURE 2 is a fragmentary side elevational view of the structure shown in FIGURE 1.

Describing the invention in detail and having particular reference to the drawings there is shown a cotton picker harvesting mechanism generally designated 2 including a pair of drums 3 and 4 spaced fore and aft and laterally at opposite sides of a plant throat 5 which has a diverging forward inlet structure 6 for admitting the row of plants to the throat for picking action by the cotton picker spindles 7 and 8 of the front and rear rotors 9 and 10 respectively as is well known to those skilled in the art and as particularly explained in U.S. Patent No. 2,140,631. The cotton is entwined on the spindle 7 or 8 and is carried within the respective drum and passed under a doffer or through a doffer structure or mechanism 12 or 13 wherein the cotton is brushed or removed from the respective spindles 7 and 8 and is discharged into an inlet opening 14 of the left-hand door structure 15 of the forward unit and into the opening 16 in the right or rear drum door structure.

Inasmuch as the doors 15 and 17 are identical except that they are left and right counterparts only, the left door will be particularly described and the appropriate reference numerals will be suitably applied to the right-hand door.

Each door structure comprises front and rear inboard and outboard substantially vertical panels 19, 20, 21, and 22. The door structure is hinged at its forward inboard corner as at 24 and the rear panel 20 along its inboard edge is rolled as at 25 to provide a catch to engage behind a latch structure 26 which is carried on a flange 27 mounted on the rear wall 28 of the associated drum. Thus the door is swingable to open and closed positions in order to provide access into the respective drum for repair and cleaning.

Figure 3:
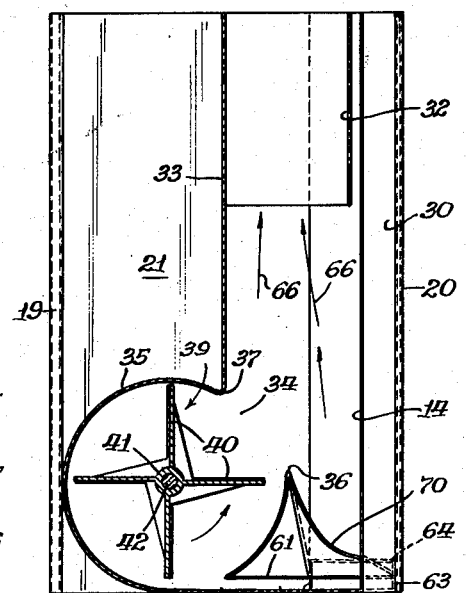
FIGURE 3 is a transverse vertical sectional view taken substantially on the line 3—3 of FIGURE 1.

The door also comprises top and bottom panels 28 and 29 which with the other panels provides an inlet chamber 30 along the rear portion of the associated door, the chamber 30 communicating with the inlet opening 14 or 16 and at its upper portion communicating with an outlet duct or pipe 32 which merges along its forward edge into a divider panel 33, the panel 33 terminating at one edge of an outlet opening 34 of the fan housing 35 which is located in the forward corner of the door, the housing 35 having an arcuate contour as best seen in FIGURE 3 and terminating in a cutoff edge 36 opposing the edge 37, said edges 36 and 37 defining the outlet opening 34 which exhausts into the chamber 30 and directs the flow of air from the fan 39 into the chamber 30 substantially vertically whereby the cotton which is being discharged and thrown into the chamber 30 from the respective doffer is entrained in the air stream and carried thereby through the duct 33 into the associated receptacle.

It will be seen that the fan 39 comprises a plurality of fan blades 40 which are connected through a hub 41 to a shaft 42, the shaft 42 being rotatably carried on suitable bearings 43 and 44 on the inboard and outboard walls 21 and 22 of the associated drum. The shaft 42 is provided with a pulley 44' outwardly of the outer wall 22, pulley 44' being driven by a belt 45 which is trained about a pulley 46 connected to a shaft 47 which is suitably supported on bearings or pillow blocks 48 on the top wall structure 49' of the cotton picker mechanism. It will be seen that the shaft 47 is driven through a gearing 52 which, in turn, is driven from a shaft 53 journaled on bearings 52 and 54 mounted on the top wall 49' of the housing, the shaft 49 being connected to the associated prime mover and providing the input drive.

Referring now to FIGURE 3, it will be noted that the fan 39 rotates in the direction of the arrow and draws the air through an inlet opening 57 in the outboard wall and carries the air with a downward sweep past an auxiliary discharge opening or outlet 59 exhausting a small volume of air through the duct work 60 which is constructed by and between the bottom wall 29 of the associated door and a wall 61 spaced vertically therefrom and a pair of side webs 62 and 63 which form a tubular duct work, said duct work 60 terminating in a discharge nozzle 64 which is underposed with respect to the respective doffer 12 or 13 and functions to blow the cotton into the air stream as shown by the arrows indicated at 66 for entraining the cotton into the stream of air whereby the same is caused to be pushed upwardly into the discharge conduit 32.

It will be seen that the rightward drum is driven from the shaft 47 through the pulley 67 which drives the belt 68 which drives the pulley 44' of the rightward drum, the same driving the shaft 42 of said rightward drum.

It will be seen that the bottom portion of each door structure is provided with a laterally downwardly and inwardly sloping panel 70 which extends from the edge 36 of the housing to the rear panel 20 of the door, the panel 70 serving to slide any cotton which may lodge in the rear corner of the door to a position where it would be entrained and carried by the air blast blowing from the nozzle 64 upwardly into the air stream 66.

It will be readily appreciated that in order to open either door the belts 45 or 68 would initially be removed from the respective pulleys about which they are trained and then the door is free to be opened or closed. It will be also appreciated that a minimum suction area is provided which is localized at the inlet of the conveying system and that immediately upon the cotton entering the air stream, it is subjected to an air blast which pushes the column of air and carries material into the associated receptacle.

Furthermore, a novel and simple arrangement has been provided for containing the mechanism in an ideal location to provide the advantages accruing as heretofore explained.

It will be understood that the embodiment heretofore described has been chosen merely by way of disclosure and not limitation and that other forms of the invention will become readily apparent to those skilled in the art within the scope of the appended claims.

What is claimed is:

1. In a harvester for cotton, a housing, gathering means therein operative to extract field borne cotton and carry it into the housing, doffing means within the housing cooperatively associated with the gathering means for removing cotton therefrom and discharging the same in a cascading stream to a preselected area of the housing, and conveying means comprising a blower in the housing with an arcuate peripheral wall having an air discharge opening contiguous to said area directing a column of air alongside said cascading stream of cotton and entraining the same within the air column, and a duct in alignment with said column of air for directing the cotton to an associated depository.

2. The invention according to claim 1 and auxiliary conveying means comprising duct work from the blower having a nozzle beneath said doffing means oriented to blow cotton from the bottom of the housing into said column of air.

References Cited in the file of this patent
UNITED STATES PATENTS

| | | |
|---|---|---|
| 2,680,341 | Haring | June 8, 1954 |
| 2,741,888 | Hamel et al. | Apr. 17, 1956 |